United States Patent
Pace

(10) Patent No.: US 6,563,081 B2
(45) Date of Patent: May 13, 2003

(54) PROCESS FOR THE LASER AND/OR PLASMA CUTTING OF STRIPS, PARTICULARLY METAL COILS, AND RELATIVE CONTINUOUS CUTTING LINES

(75) Inventor: Pierluigi Dalla Pace, Mareno di Piave (IT)

(73) Assignee: Iron S.p.A., Mareno di Piave (IT)

( * ) Notice: Subject to any disclaimer, the term of this patent is extended or adjusted under 35 U.S.C. 154(b) by 0 days.

(21) Appl. No.: 09/832,772

(22) Filed: Apr. 9, 2001

(65) Prior Publication Data

US 2001/0030180 A1 Oct. 18, 2001

(30) Foreign Application Priority Data

Apr. 14, 2000 (IT) ......................................... TV20A0044

(51) Int. Cl.⁷ .............................................. B23K 26/00
(52) U.S. Cl. .............................. 219/121.72; 219/121.67
(58) Field of Search ....................... 219/121.72, 121.67, 219/121.68, 121.69

(56) References Cited

U.S. PATENT DOCUMENTS

| | | | | |
|---|---|---|---|---|
| 3,761,675 A | * | 9/1973 | Mason et al. | 219/121 LM |
| 5,182,428 A | * | 1/1993 | Jack et al. | 219/121.63 |
| 5,444,210 A | * | 8/1995 | Bingener et al. | 219/121.67 |
| 5,532,451 A | * | 7/1996 | La Rocca | 219/121.64 |
| 5,618,453 A | * | 4/1997 | La Rocca | 219/121.63 |

* cited by examiner

Primary Examiner—M. Alexandra Elve
(74) Attorney, Agent, or Firm—Harrison & Egbert

(57) ABSTRACT

Process for the laser and/or plasma cutting of strips, particularly metal coils, and relative continuous cutting lines in which, upstream of the cutting line, there is a strip of metal in the form of a coil supported on a reel, positioned for unwinding, and in which the strip is initially straightened and then, using a transport system, is sent downstream towards a support bed, and is locally processed by the movement of an overhead focusing head which is part of the laser or plasma cutting unit. While cutting, the focusing head is mobile and moves exclusively along the axis which is transversal to the longitudinal forward travel axis of the strip. The strip is carried further downstream by an evacuation table, on which both the waste pieces and the finished pieces or details remain together, after which they are later separated.

8 Claims, 1 Drawing Sheet

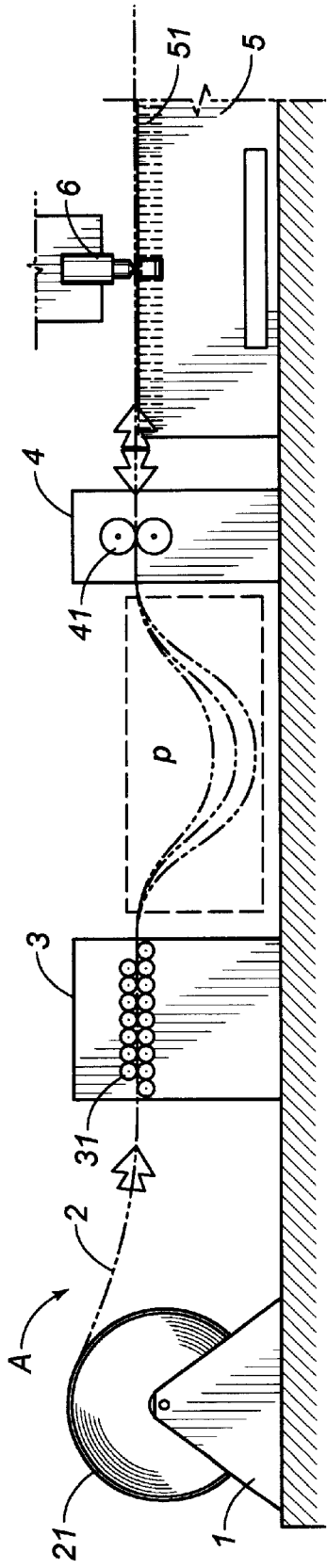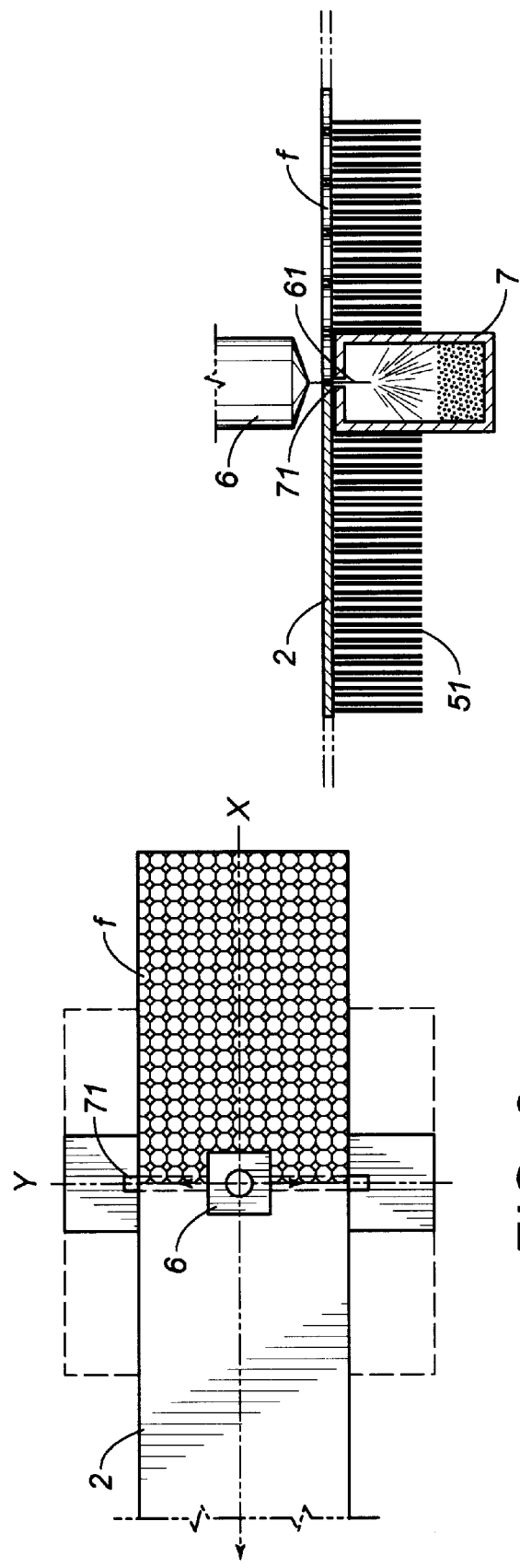

PROCESS FOR THE LASER AND/OR PLASMA CUTTING OF STRIPS, PARTICULARLY METAL COILS, AND RELATIVE CONTINUOUS CUTTING LINES

BACKGROUND OF THE INVENTION

1. Field of the Invention

The object of the invention contained herein is a process for the laser and/or plasma cutting of strips, particularly metal coils, and relative continuous cutting lines.

The invention has particular, but not necessarily exclusive, application in the mechanical engineering industry.

2. Description of Related Art

Laser or plasma cutting lines for plate are widely used, and the plates may be predisposed in the form of single sheets or continuous coils. The said type of plant is widely used in the industrial sector, for the production of large batches of components or for certain details which require extreme precision, and for pieces with either small or large dimensions.

In the cutting units of these machines, there is basically a fixed or mobile focusing head which is held at a short distance from the sheet by means of an accurate centering system (auto-focus), and which emits a perpendicular laser beam which penetrates the thickness of the material, and then carries out the cutting of the material.

The said apparatus, in the zone immediately below the focusing head, has to be equipped with special equipment which, on the one hand, by means of its particular conformation, helps to support the plate, while on the other hand helps to evacuate the toxic fumes and liquefied particles that are given off.

A typical example is made up of a cutting bed, which is sufficiently large to contain at least the maximum foreseen dimension of the plate to be cut, made up of a mesh or comb-type structure. One of the characteristics of the said cutting bed is given by the fact that, on the side that supports the plate, there is a series of protruding bodies with rounded tips, similar to nails. These nails keep the plate at a certain distance from the mesh structure, in order to help the cutting cycle. The mesh is also used to sift the swarf that results from the process, which falls through the mesh and is collected in a bin below the bed.

The bin works in conjunction with the above cutting bed, and has mechanical systems to evacuate the waste materials and motor-driven pumps to draw off all the liquefied particles and toxic fumes that are produced by the cutting head when it is in operation.

Regarding the focusing head of the cutting unit, there are currently two types available.

The first type has a static focusing head. In this case, the sheet is moved below the focusing head, and is held in place around its edges by a special clamping system, which grips the edges of the sheet. There is a logic unit which is programmed in order to communicate between the focusing head and the clamping system, in order to carry out a coordinated movement of the clamping system which thus moves the sheet in one direction or another.

The second type has a movable focusing head. In this case, the metal strip or sheet passes in the area below the head, moved step by step by means of a special transport mechanism. Going further into detail, since the cutting unit moves along two axes (x, y), the sheet is moved into position longitudinally and then held in a given position so that the cutting unit can carry out the cutting operation according to the program. Once the cutting cycle has been completed, the sheet is moved forward to leave the finished product, while the waste material is collected by the equipment positioned below the table. There is also a logic unit in the second case, which communicates between the pre-imposed movements of the cutting unit and the forward movement system for the strip or sheet. The movement phase is only carried out when the message is received from the logic unit, that is when the cutting cycle for each single piece has been completed.

DRAWBACKS

With the solutions described above, even though they are both technically valid, there are various drawbacks.

Firstly, with both systems, once the piece has been cut and is still held in place by a micro-joint, it may fall into the area below the bed because of the movement and vibrations of the bed, especially of the protruding nails. The frequency of this event means that a number of cut pieces are accumulated or even lost in the equipment, below the cutting bed which is used for collecting and evacuating the cutting swarf, and which also interfere with the toxic fumes evacuation system. The material causes problems with both the waste recovery and fume evacuation systems, which results in a reduction of the efficiency of the systems and an increase in the amount of maintenance required.

Furthermore, from a technological point of view, the said equipment is rather complex and has a high manufacturing cost, and it is weighs quite heavily on the overall cost of the plant.

The plant also occupies a large amount of space. The cutting bed has to be sized according to the dimensions of strip or sheet which is to be processed, with a surface that is, therefore, at least large enough to hold each sheet. Regarding the work carried out on strips, the said apparatus, apart from the width of the bed, has to also take into consideration a cutting bed length which is sufficient for the longitudinal cutting cycle to be carried out. As a result, in order to carry out cuts on large objects, the area required for a correct installation of the plant has to be proportionally large.

As a consequence of the limits imposed by the existing equipment, the longitudinal cuts that can be carried out on the strips will depend on the size of the equipment. Therefore, with the current equipment available, it is not possible to cut pieces or details with an undefined length, or equal to the total length of the coiled strip.

The aim of this invention is also to overcome the aforementioned drawbacks.

SUMMARY OF THE INVENTION

This and other aims are achieved through the use of this invention according to the characteristics in the attached claims, solving the problems described by means of a laser or plasma cutting process for strips, especially metal coils, and relative continuous cutting lines in which a coil held on a reel is unwound upstream of the cutting line. In the said system, the strip is initially straightened and then moved downstream by a transport system towards a support bed. There is a focusing head positioned above the support bed, which is part of the laser or plasma cutting unit. The said focusing head, during the cutting cycle, is mobile along an axis, which is transversal with respect to the longitudinal movement of the strip. The said strip is moved downstream along an evacuation bed on which the both waste pieces and the finished pieces lay flat, and which are later separated.

ADVANTAGES

In this way, through the creative contribution of the system, which leads to an immediate technical progress, various advantages are achieved.

The first advantage is given by the possibility of cutting pieces or details of an undefined length, or at least the overall length of the strip, which is not possible with any other type of plant.

The second advantage is given by the fact that the complex equipment and systems that are usually positioned below the cutting bed are eliminated, which reduces the transversal area required and is sized according to the fume and liquefied particles evacuation system, which in this case coincides with the travel axis of the focusing head.

By eliminating the equipment which includes the mechanical recovery of waste material from below the focusing head, maintenance operations are eliminated and there is no longer the risk of finished pieces, especially small ones, falling in the area below along with the waste material and being lost.

A further benefit regards the fact that the size and consumption figures for the plant are reduced, leading to an increased flexibility, due to the fact that small batches may also be produced, and an increase in productivity thanks to the availability of all the pre-imposed cutting parameters. Furthermore, the cutting path is optimised, there is good modulation of the power and, above all, the material is always on-line with no, or very little, time lost for changing the type of cycle to be carried out.

A further advantage is that the equipment is very reliable, the cost for buying and running the equipment is quite low, and the maintenance operations are reduced to a minimum.

These and other advantages will be explained in the following detailed description and attached schematic drawings of a preferred application of the system, the details of which are to be considered simply examples and not limitations of the system.

BRIEF DESCRIPTION OF THE DRAWINGS

FIG. 1 is a linear side view of a typical continuous laser or plasma cutting line, starting from the coiled metal strip.

FIG. 2 is a plan view of a part of the metal strip during a cutting cycle, in a station that includes a mobile focusing head on an axis which is transversal with respect to the longitudinal travel of the strip.

FIG. 3 is a side view of the part regarding the liquefied particles and toxic fumes collection system, positioned transversally to the forward movement path of the strip, and which coincides with the focusing head positioned above.

DESCRIPTION OF AN EMBODIMENT EXAMPLE

In the case under examination, a continuous line (A) for the laser cutting of metal is made up from the start, upstream, to the end, downstream of basically four main sections.

The first section has a reel (1) positioned upstream for unwinding the strips of sheet (2) from coils (21). The said reel (1) carries out a controlled unwinding of the sheet (2) until it reaches a successive station (3) where the unwound sheet (2) is straightened by passing it through a series of straightening rolls (31) alternately positioned one after the other.

Between the straightening station (3) and the cutting unit positioned further downstream, there is another station (4) that carries out the movement of the sheet strip (2) to a micrometric degree of accuracy along the forward travel axis (x). Going into detail, the said station (4) has a pair of counter-rotating rolls (41) through which the sheet strip (2) passes, and which is then sent further downstream. The said pair of rolls (41), being rotating, are made to rotate in one direction or the other so that the strip (2) may be transported towards the next downstream station or pulled back. This movement, repeated at a high frequency and at various speeds by changing the rotation speed of the rolls (41), is determined by the dialogue which takes place between the station (4) itself and the cutting unit (5, 6), the movements and operation of which are coordinated in turn by a logic unit which is pre-set by the operator.

In order to give a continuous backwards and forwards movement, but without provoking a relative unwinding of the sheet (2) from its reel (21) there is an accumulation buffer between the movement station (4) and the straightening station (3). In this area which is defined (p), the sheet (2) is left free to deflect accordingly downwards, so that when the cutting operation is carried out down stream it is left to fluctuate within the elastic limits of the material, rather than it being pulled and stretched.

The strip of sheet (2) thus moved in this way through the station (4) is submitted to the same amount of movement in correspondence with the cutting unit (5, 6) which is made up of a bed (5) and a forward travel table (51), and an overhead focusing head (6). One of the characteristics of the said bed (5) is given by the fact that it has a containment chamber (7) positioned transversally with respect to the longitudinal forward travel axis (x) of the strip (2) and in correspondence with the advancement table (51). The said chamber (7) has a longitudinal opening (71) along at least the upper surface through which, while moving along the (y) axis, the laser beam (61) emitted by the overhead focusing head, (6) is transmitted. In this particular case, it is foreseen that the said chamber (7) is connected to special equipment which draws off the liquefied particles and toxic fumes and, where possible, a recovery of the heat energy.

Finally, regarding the focusing head (6), while it is carrying out the cutting operation on the sheet (2), it only moves along the (y) axis which is transversal with respect to the longitudinal forward travel axis (x) of the strip (2), and is synchronised with the movement system (41) of the station (4) which is positioned upstream.

Once the cut of the pieces (f) is completed, they are sent forward downstream together with the waste pieces, where they are later mechanically separated without losing any of the pieces.

What is claimed is:

1. A process for laser cutting of a strip of metal from a coil comprising:

positioning the coil on a reel upstream from a cuffing line;

unwinding the strip of metal from the coil;

straightening the strip of metal in a straightening station downstream from the positioned coil;

transporting the straightened strip of metal toward a cutting station along a longitudinal forward travel axis, said cutting station having a support bed upon which the straightened strip of metal is transported therealong, said cutting station having a cutting head integrated thereto and positioned above the transported straightened strip of metal, said cutting station having movement controlling rollers at an upstream end thereof, an accumulation buffer area being formed between said straightening station and said movement controlling rollers;

cutting the strip of metal in said cutting station by moving said cutting head exclusively along an axis transverse to said longitudinal forward travel axis of the strip of metal; and deflecting the straightened strip of metal downwards into said accumulation buffer area during said step of cutting.

2. The process of claim 1, further comprising;

rotating the movement controlling rollers in one direction or another direction so as to transport the strip of metal toward the cutting station or away from the cutting station along the longitudinal forward travel axis.

3. The process of claim 2, further comprising:

coordinating the rotation of the movement controlling rollers and said cutting station by communication through a pre-set logic unit.

4. The process of claim 3, said step of coordinating comprising:

coordinating the rotation of said movement controlling rollers and said cutting head by communication through said pre-set logic unit.

5. The process of claim 1, further comprising:

transporting the cut strip of metal downstream from said cutting station; and separating waste pieces from the transported cut strip of metal.

6. A continuous cutting system for laser cutting of a strip of metal from a coil comprisings;

at least one reel having the coil therearound;

a straightening means positioned downstream from the reel, said straightening means for straightening the strip of metal after unwinding from the coil on the reel;

a movement means positioned downstream from said straightening means, said movement means for moving the strip of metal with a micronetric degree of accuracy along a forward travel axis;

a cutting means having at least one bed with an advancement table and an overhead focusing head, said overhead focusing head moveable along an axis that is transverse to said forward travel axis, said cutting means for laser cutting the strip of metal; and a buffer accumulation means positioned between said straightening means and said movement means, said buffer accumulation means for receiving a downward deflection of the strip of metal during the laser cutting of the strip of metal.

7. The system of claim 6, the bed of said cutting means having a containment chamber positioned transverse to the forward travel axis, said containment chamber having a longitudinal opening along an upper surface of the bed, said longitudinal opening aligned with said overhead focusing head.

8. The system of claim 7, further comprising;

suction means connected to said containment chamber for drawing off liquefied particles and toxic fumes from said containment chamber.

* * * * *